(12) United States Patent
Kells

(10) Patent No.: US 10,837,470 B2
(45) Date of Patent: Nov. 17, 2020

(54) FLUID POWERED ROTARY ACTUATOR AND AN IMPROVED SEALING SYSTEM

(71) Applicant: TOROIDAL RAMS LIMITED, Auckland (NZ)

(72) Inventor: James Antony Kells, Taupo (NZ)

(73) Assignee: TR TECHNOLOGIES LIMITED, Auckland (NZ)

(*) Notice: Subject to any disclaimer, the term of this patent is extended or adjusted under 35 U.S.C. 154(b) by 22 days.

(21) Appl. No.: 16/090,406

(22) PCT Filed: Mar. 30, 2017

(86) PCT No.: PCT/NZ2017/050036
§ 371 (c)(1),
(2) Date: Oct. 1, 2018

(87) PCT Pub. No.: WO2017/171564
PCT Pub. Date: Oct. 5, 2017

(65) Prior Publication Data
US 2019/0113056 A1    Apr. 18, 2019

(30) Foreign Application Priority Data

Mar. 30, 2016 (NZ) ........................................ 718501

(51) Int. Cl.
*F15B 15/12* (2006.01)
*F15B 15/08* (2006.01)
(Continued)

(52) U.S. Cl.
CPC .......... *F15B 15/125* (2013.01); *F15B 15/082* (2013.01); *F15B 15/12* (2013.01); *F16J 15/545* (2013.01); *F15B 15/02* (2013.01)

(58) Field of Classification Search
CPC ........ F16B 15/12; F16B 15/125; F16B 15/02; F16B 15/082; F16J 15/545
See application file for complete search history.

(56) References Cited

U.S. PATENT DOCUMENTS 2,657,538 A * 11/1953 Myers ................... F15B 15/125
                                                              92/120
2,996,049 A * 8/1961 Huska ..................... F16K 31/12
                                                              92/120
(Continued)

FOREIGN PATENT DOCUMENTS

DE           872000 C       3/1953
DE        29603706 U1       4/1996
(Continued)

OTHER PUBLICATIONS

International Search Report, PCT/NZ2017/050036, dated Jun. 13, 2017.
(Continued)

*Primary Examiner* — Dustin T Nguyen
(74) *Attorney, Agent, or Firm* — Nixon & Vanderhye

(57) ABSTRACT

A fluid powered rotary actuator having a first member which is pivotally connected to a second member and which is includes at least one toroidal shaped spear or piston which acts within a correspondingly shaped toroidal shaped cylinder to move the first member relative to the second member. The or each toroidal shaped spear or piston and cylinder assembly includes seals mounted within a seal carrier and the configuration allows movement of the seals relative to the or each cylinder. This configuration allows the seals to continue to provide a leak resistant hydraulic seal between each toroidal shaped spear or piston and its associated cylinder even in cases where the toroidal shaped spears or pistons deflect relative to their associated cylinders. The cylinders are also mounted to the first or second members in a manner designed to reduce the chance of tensile cracking due to deflection of the cylinders.

21 Claims, 5 Drawing Sheets

Figure 5:
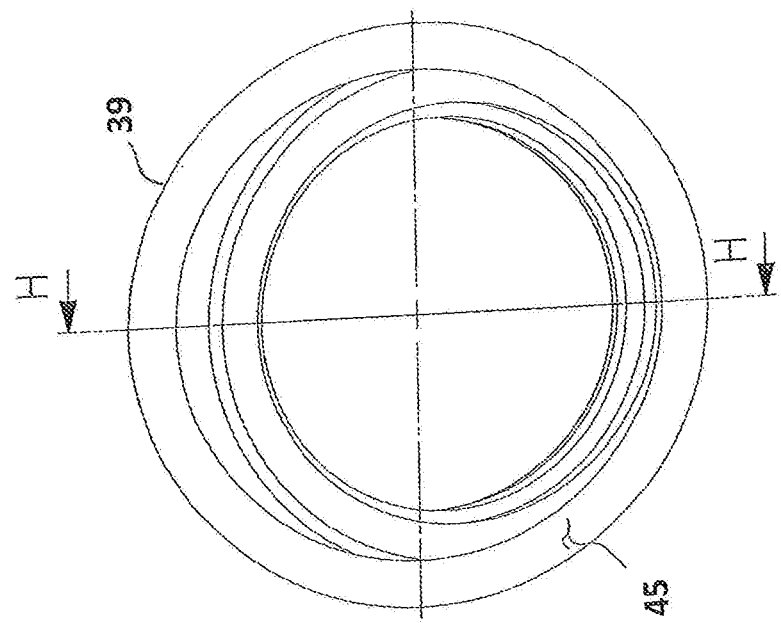

(51) Int. Cl.
*F16J 15/54* (2006.01)
*F15B 15/02* (2006.01)

(56) References Cited

U.S. PATENT DOCUMENTS

| | | | |
|---|---|---|---|
| 4,242,947 A * | 1/1981 | Renner | F15B 15/125 |
| | | | 92/108 |
| 5,007,330 A * | 4/1991 | Scobie | F15B 15/125 |
| | | | 277/589 |
| 5,044,257 A | 9/1991 | Scobie et al. | |
| 5,054,374 A * | 10/1991 | Scobie | F15B 15/125 |
| | | | 277/581 |
| 5,235,900 A * | 8/1993 | Garceau | F15B 15/125 |
| | | | 92/120 |
| 5,495,791 A | 3/1996 | Sande et al. | |
| 7,895,935 B2 * | 3/2011 | Kells | F15B 15/125 |
| | | | 92/120 |

FOREIGN PATENT DOCUMENTS

| EP | 0 098 614 A2 | 1/1984 |
|---|---|---|
| WO | 2007/003000 A1 | 1/2007 |

OTHER PUBLICATIONS

Extended European Search Report issued in European Patent Application No. 17775964.4 dated Oct. 30, 2019.

* cited by examiner

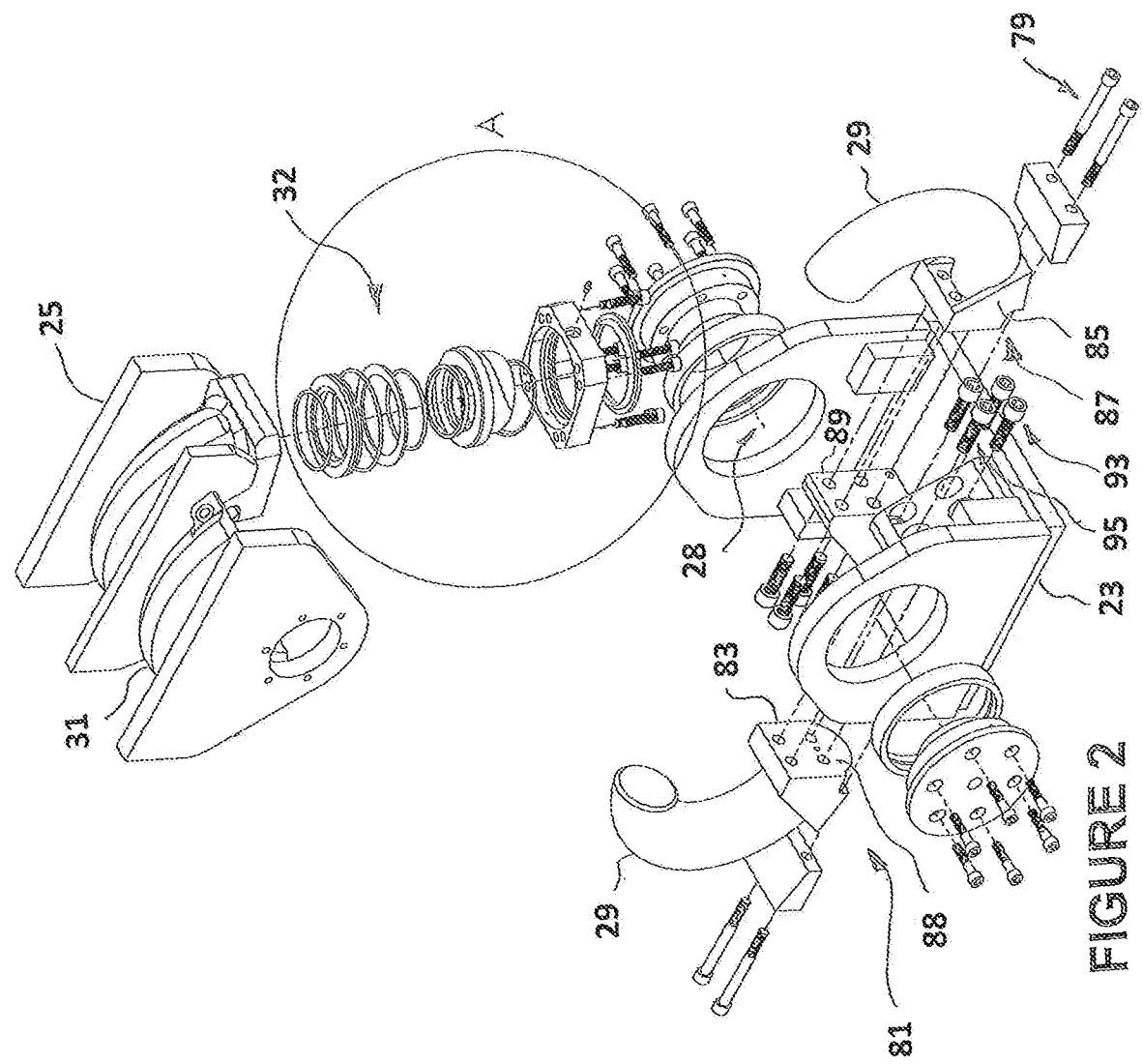
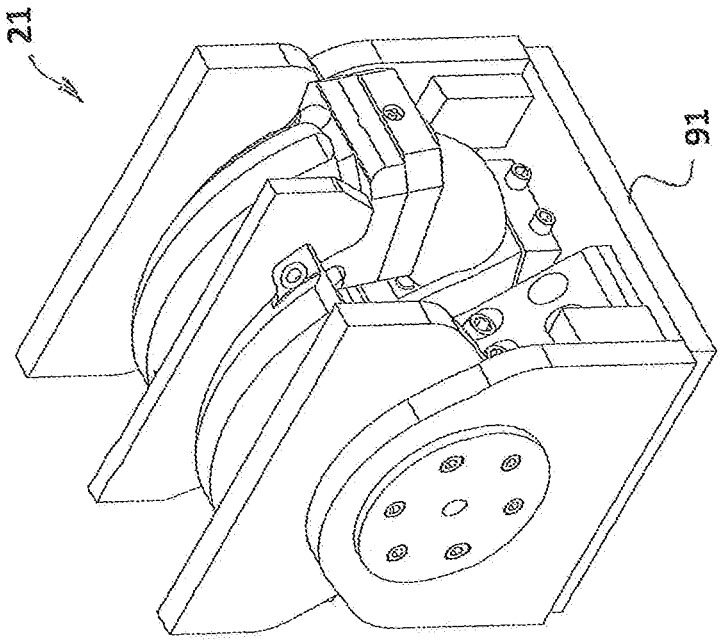
FIGURE 2
FIGURE 1

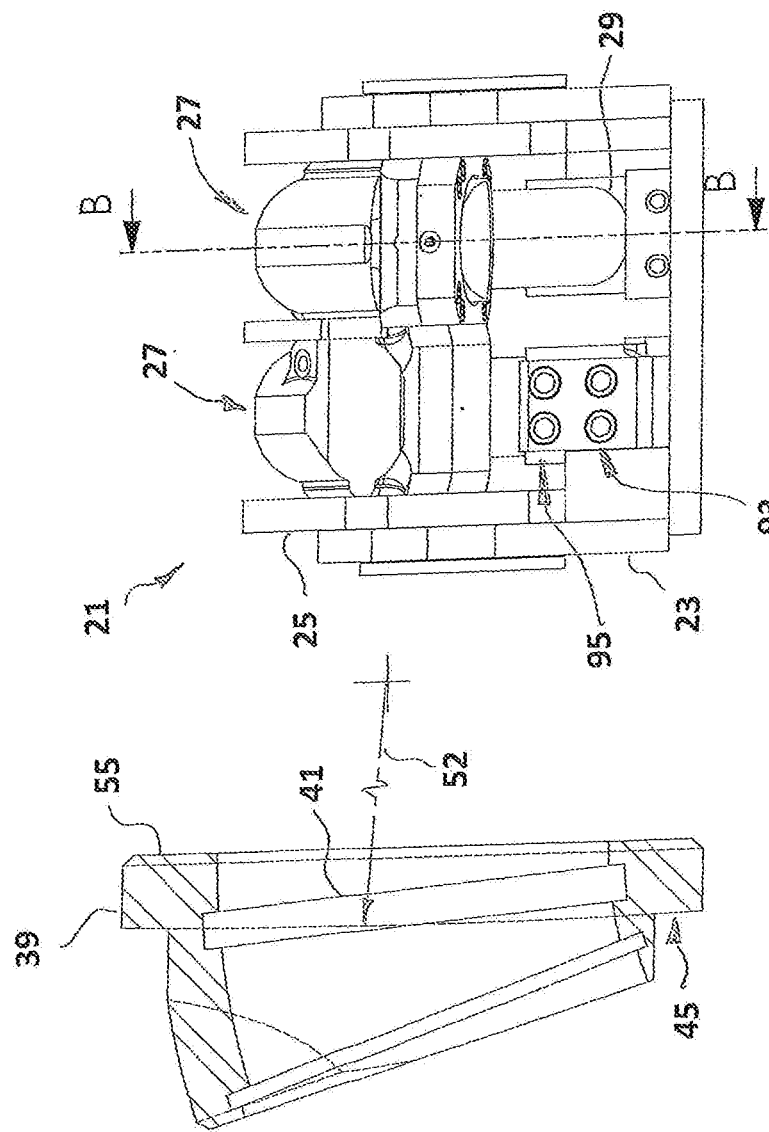

US 10,837,470 B2

FLUID POWERED ROTARY ACTUATOR AND AN IMPROVED SEALING SYSTEM

FIELD OF THE INVENTION

This invention relates to a fluid powered rotary actuator and an improved sealing system, and in particular, but not exclusively to a hydraulic rotary actuator having toroidal shaped pistons and a sealing system that is particularly suited to such a rotary actuator.

BACKGROUND

Hydraulic rotary actuators that have toroidal shaped pistons are still relatively new technology. This type of actuator has the advantage that they are relatively simple, with few moving parts, and they provide constant torque throughout their range of motion. The inventor of the present invention has been working on this type of actuator for approximately twelve years with the aim of producing a robust and reliable working model. He is also the inventor of the rotary actuator described in U.S. Pat. No. 7,895,935.

This emerging technology has not been widely used to date due to a number of inherent difficulties. The present invention is the result of many years of testing, failures, redesign and further testing. The present invention includes recently developed features that have been incorporated into his rotary actuator design to solve the significant problems discovered during the testing of protoypes which involved over three hundred thousand test cycles.

These problems centred around five main areas—(1) difficulty in achieving accurate alignment between the toroidal spear or piston and the cylinder, (2) binding between the toroidal spear or piston and the cylinder, (3) hydraulic pressure sealing, (4) toroidal spear or piston strength or resistance to fatigue cracking, and (5) toroidal cylinder manufacture.

Alignment of a straight spear with a straight cylinder is relatively simple. However, alignment of a toroidal shaped spear with a toroidal shaped cylinder is a much more difficult task. Minute variations in the alignment of the radius of curvature of each part have a significant effect on clearances throughout the range of movement of a toroidal actuator. This problem is further aggravated by deflection of the spear when the actuator is under load.

The toroidal shaped spears or pistons of a hydraulic rotary actuator of this type, experience significant bending forces when the actuator is under load. These forces produce deflection in the spears, which are secured at one end to a driven member or frame of the actuator. The amount of deflection will vary greatly depending on the loads applied to the actuator, and the operating pressures, and the deflection also varies depending on the amount that the toroidal spear is extended from the toroidal cylinder.

This deflection in combination with any misalignment issues can result in undesired contact between the spear or piston and the cylinder, leading to excessive wear and in some cases to binding between the cylinder and the spear or piston.

The deflection and possible misalignment issues also present challenges to the sealing system used to achieve a high pressure dynamic seal between the spear and the cylinder.

Binding between the spear and cylinders, poor seal performance, and premature seal failure were common in the early prototypes tested by the inventor.

The stress on the toroidal spears also presents structural challenges. Early prototypes experienced fatigue cracking. The cracking typically occurred at the base of the toroidal spears, at their connection to a frame or housing, or to a driven member, of the actuator.

While the machining of toroidal shaped spears is difficult, the forming of a toroidal shaped bore is even more difficult. Early prototypes of a hydraulic rotary actuator with toroidal shaped pistons, which were tested by the inventor, encountered difficulties in accurately mounting bearing rings used to support and guide the toroidal shaped spears.

It is envisaged that the difficulties encountered in providing a sealing system for a rotary actuator having toroidal shaped spears or pistons may also be encountered in other situations, for example where appreciable deflection occurs in a spear of a conventional linear hydraulic ram.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT

It is therefore an object of the present invention to provide a fluid powered rotary actuator which will at least go some way towards overcoming one or more of the above mentioned problems, or at least provide the public with a useful choice.

STATEMENTS OF THE INVENTION

Accordingly, in a first aspect, the invention may broadly be said to consist in a fluid powered rotary actuator, comprising a first member which is pivotally connected to a second member, the first and second members also being operatively connected by at least one hydraulic actuator, the or each hydraulic actuator having; a substantially toroidal shaped or part toroidal shaped spear or piston, a substantially toroidal shaped or part toroidal shaped cylinder configured to receive the toroidal shaped spear or piston, and a sealing system configured to minimise or prevent leakage of fluid from the cylinder; wherein the sealing system includes a seal assembly which further includes a seal carrier configured to support a sealing member, and the sealing system is configured such that the seal carrier is able to rotate or rock about an axis that is substantially not parallel the direction of travel of the part of the spear or piston that is adjacent to the sealing member.

Preferably the seal carrier is able to rotate or rock about an axis that is substantially parallel to the axis of the pivotal connection between the first member and the second member.

Preferably the or each seal assembly is configured to allow movement of the sealing member in a plane substantially perpendicular to the direction of travel of the part of the spear or piston that is adjacent to the sealing member.

Preferably the seal assembly is configured such that the seal carrier can move in the plane substantially perpendicular to the direction of travel of the part of the spear or piston that is adjacent to the sealing member.

Preferably the or each seal carrier includes a first bearing surface that is configured to bear against a corresponding second bearing surface of a seal assembly mounting groove which forms part of the sealing system of its associated hydraulic actuator.

Preferably the or each first bearing surface is a surface on the seal carrier that is placed under bearing stress by the pressure within the cylinder.

Preferably the or each seal carrier first bearing surface is a convex surface.

Preferably the or each convex bearing surface of the seal carrier is a part circular, or arc shaped surface.

Preferably the or each seal assembly includes a washer or packing made of a resilient material and situated between an aft surface of the seal carrier and an aft surface of the seal assembly mounting groove of its associated hydraulic actuator.

Preferably the or each washer or packing is made of an elastomeric material, for example urethane.

Preferably the or each seal assembly includes a substantially rigid washer situated between the seal carrier and the elastomeric washer or packing.

Preferably an inside diameter of the or each seal carrier has a part toroidal shaped bearing surface configured to engage with and slide over its associated spear.

Preferably the or each toroidal shaped bearing surface has an arc of contact with its associated spear of at least fifteen degrees.

Preferably the or each seal carrier supports a wiper device.

Preferably the or each wiper device is spaced apart from its associated sealing member, and lies in a plane that is at an angle of at least ten degrees from the plane of its associated sealing member.

Preferably the or each seal assembly is situated adjacent to the opening of its associated cylinder.

Preferably the or each seal assembly is held within its associated seal assembly mounting groove by a mounting collar.

Optionally the or each seal carrier is restrained from rotating about the principle axis of its associated sealing member, for example by keying the or each seal carrier within its associated seal mounting groove.

Preferably the or each hydraulic actuator is provided with means to supply a lubricant to at least the first bearing surface of its associated seal carrier, for example a grease nipple which communicates with the or each seal mounting groove.

Optionally the or each seal assembly is situated on its associated spear or piston.

Preferably the fluid powered rotary actuator is a hydraulic rotary actuator.

In a second aspect, the invention may broadly be said to consist in a fluid powered rotary actuator, comprising a first member which is pivotally connected to a second member, the first and second members also being operatively connected by at least one hydraulic actuator, the or each hydraulic actuator having; a substantially toroidal shaped or part toroidal shaped spear or piston, a substantially toroidal shaped or part toroidal shaped cylinder configured to receive the toroidal shaped spear or piston, and a seal assembly configured to minimise or prevent leakage of fluid from the cylinder; wherein the seal assembly is configured to allow a range of movement of a sealing member of the seal assembly, the movement not being restricted to a direction that is substantially parallel to the direction of travel of the part of the spear or piston that is adjacent to the sealing member, and the seal assembly includes a seal carrier configured to support the sealing member, and the seal assembly is situated within a seal assembly mounting groove located in the cylinder; and wherein contact between the at least one seal carrier and its associated cylinder includes contact between two surfaces, a first bearing surface on the seal carrier, and a second bearing surface within the seal assembly mounting groove, and at least one of these bearing surfaces is a convex bearing surface.

Preferably the range of movement of the sealing member includes movement that is substantially in a plane perpendicular to the direction of travel of the part of the spear or piston that is adjacent to the sealing member.

Preferably the seal assembly is configured such that the seal carrier can move in the plane substantially perpendicular to the direction of travel of the part of the spear or piston that is adjacent to the sealing member.

Preferably the seal carrier is configured such that the seal carrier is able to rotate or rock about an axis that is substantially parallel to the axis of the pivotal connection between the first member and the second member.

Preferably the first bearing surface is a surface on the seal carrier that is placed under bearing stress by the pressure within the cylinder.

Preferably the seal carrier first bearing surface is a convex surface.

Preferably the convex bearing surface of the seal carrier is a part circular, or arc shaped surface.

Preferably the seal assembly includes a washer or packing made of a resilient material and situated between a rear surface of the seal carrier and a rear surface of the seal assembly mounting groove of its associated hydraulic actuator.

Preferably the washer or packing is made of an elastomeric material, for example urethane.

Preferably the seal assembly includes a substantially rigid washer situated between the seal carrier and the washer or packing made of a resilient material.

Preferably an inside diameter of the seal carrier has a part toroidal shaped bearing surface configured to engage with and slide over its associated spear.

Preferably the toroidal shaped bearing surface has an arc of contact with its associated spear of at least fifteen degrees.

Preferably the seal carrier supports a wiper device.

Preferably the wiper device is spaced apart from its associated sealing member, and lies in a plane that is at an angle of at least ten degrees from the plane of its associated sealing member.

Preferably the seal assembly is situated adjacent to an opening of its associated cylinder.

Preferably the seal assembly is held within its associated seal assembly mounting groove by a mounting collar.

Optionally the seal carrier is restrained from rotating about the principle axis of its associated sealing member, for example by keying the seal carrier to its associated seal mounting groove.

Preferably the or each hydraulic actuator is provided with a lubrication system configured to supply a lubricant to at least the first bearing surface of its associated seal carrier, for example a grease nipple which communicates with the or each seal mounting groove.

Optionally the seal assembly is situated on its associated spear or piston.

Preferably the fluid powered rotary actuator is a hydraulic rotary actuator.

In a third aspect, the invention may broadly be said to consist in a fluid powered rotary actuator having; a first member which is pivotally connected to a second member, the first and second members also being operatively connected by at least one hydraulic actuator, the or each hydraulic actuator having a substantially toroidal shaped or part toroidal shaped piston or spear and a substantially toroidal shaped or part toroidal shaped cylinder configured to receive the toroidal shaped piston or spear; and the rotary actuator further comprises a rigid connection between the or each toroidal shaped piston or spear and its associated first or second member, the rigid connection having a fastening system that comprises at least two fastened areas, a first fastened area situated at a location within the rigid connection that experiences compressive loading when the rotary actuator is in use, and a second fastened area situated at a location within the rigid connection that experiences tensile loading when the rotary actuator is in use; and wherein the rigid connection further includes a pre-stressing system configured to pre-load the first fastened area with tensile stress.

Preferably the pre-stressing system is also configured to pre-load the second fastened area with compressive stress.

Preferably the fastening system includes threaded fasteners.

Preferably the fastening system connects a foot or base portion of the or each piston or spear to its associated first or second member.

Preferably the pre-stressing system includes a pre-stressing mechanism configured to apply a force having at least a component that acts in line with a major radius of the toroidal piston or spear adjacent to the pre-stressing mechanism.

Preferably the pre-stressing system includes a wedged compression joint.

Preferably the pre-stressing mechanism includes a wedge shaped member.

Optionally the pre-stressing mechanism includes one or more threaded members.

Preferably the fastening system includes two fastened areas, a first fastened area located on the foot or base portion adjacent to the pre-stressing mechanism and a second fastened area situated between the first fastened area and an edge of the foot or base portion that is distal to the pre-stressing mechanism.

Preferably the or each wedge shaped member is a separate member that is wedged between a first wedge bearing surface on its associated piston or spear and a second wedge bearing surface on its associated first or second member.

Preferably the or each separate wedge shaped member is wedged into position using one or more threaded fasteners.

Preferably the bearing surface on the or each piston or spear is a flat surface formed on the foot or base portion of the or each piston or spear.

In a fourth aspect, the invention may broadly be said to consist in a fluid powered rotary actuator, comprising a first member which is pivotally connected to a second member, the first and second members also being operatively connected by at least one hydraulic actuator, the or each hydraulic actuator having a substantially toroidal shaped or part toroidal shaped piston or spear and a substantially toroidal shaped or part toridal shaped cylinder configured to receive the toroidal shaped piston or spear, wherein the or each cylinder is sized and shaped such that clearance is provided between the internal walls of the cylinder and its associated toroidal shaped piston or spear during the full range of movement of the toroidal shaped piston or spear when the rotary actuator is operated in a loaded or unloaded manner.

Preferably there are no bearing surfaces, or bearing members situated between the or each cylinder and its associated toroidal shaped piston or spear, and which constrain movement of the piston or spear.

Preferably a seal assembly configured to minimise or prevent leakage of fluid from the or each cylinder is configured to allow a sealing member of the seal assembly to move in a plane substantially perpendicular to the direction of travel of the part of the spear or piston adjacent to the sealing member.

Preferably the seal assembly is configured such that the seal carrier can move in the plane substantially perpendicular to the direction of travel of the part of the spear or piston adjacent to the sealing member.

Preferably the or each seal carrier is configured such that the or each seal carrier is able to rotate or rock about an axis that is substantially parallel to the axis of the pivotal connection between the first member and the second member.

Preferably the or each seal carrier includes a first bearing surface that is configured to bear against a corresponding bearing surface of a seal assembly mounting groove of its associated hydraulic actuator.

Preferably the or each first bearing surface is a surface on the seal carrier that is placed under bearing stress by the pressure within the cylinder.

Preferably the or each seal carrier first bearing surface is a convex surface.

Preferably the or each convex bearing surface of the seal carrier is a part circular, or arc shaped surface.

Preferably the or each seal assembly includes a washer or packing made of a resilient material and situated between an aft surface of the seal carrier and an aft surface of the seal assembly mounting groove of its associated hydraulic actuator.

Preferably the or each washer or packing is made of an elastomeric material, for example urethane.

Preferably the or each seal assembly includes a substantially rigid washer situated between the seal carrier and the elastomeric washer or packing.

Preferably an inside diameter of the or each seal carrier has a part toroidal shaped bearing surface configured to engage with and slide over its associated spear.

Preferably the or each toroidal shaped bearing surface has an arc of contact with its associated spear of at least fifteen degrees.

Preferably the or each seal carrier supports a wiper device.

Preferably the or each wiper device is spaced apart from its associated sealing member, and lies in a plane that is at an angle of at least ten degrees from the plane of its associated sealing member.

Preferably the or each seal assembly is situated adjacent to the opening of its associated cylinder.

Preferably the or each seal assembly is held within its associated seal mounting groove by a mounting collar.

Optionally the or each seal carrier is restrained from rotating about the principle axis of its associated sealing member, for example by keying the or each seal carrier to its associated seal mounting groove using a dowel pin.

Preferably the or each hydraulic actuator is provided with means to supply a lubricant to at least the first bearing surface of its associated seal carrier, for example a grease nipple which communicates with the or each seal mounting groove.

Optionally the or each seal assembly is situated on its associated spear or piston.

In a fifth aspect, the invention may broadly be said to consist in a machine or device incorporating at least one fluid powered rotary actuator substantially as specified herein.

Preferably device is a tilt hitch for use with excavation equipment.

In a sixth aspect, the invention may broadly be said to consist in a sealing system for a fluid powered actuator, the fluid powered actuator having at least one cylinder and spear or piston assembly and the sealing system is configured to prevent or minimise fluid leakage from the cylinder where the spear or piston extends from the cylinder, the sealing system having a sealing member and a seal carrier configured to support the sealing member, and the sealing system is configured such that the seal carrier can move relative to the cylinder in a plane substantially perpendicular to the direction of travel of the part of the spear or piston adjacent to the sealing member.

Preferably the or each seal carrier is configured such that the or each seal carrier is able to rotate or rock about an axis that is substantially parallel to the axis of a pivotal connection between the spear or piston and a mounting formation to which the spear or piston is pivotally connected.

Preferably the or each seal carrier includes a first bearing surface that is configured to bear against a corresponding bearing surface of a seal assembly mounting groove of its associated fluid powered actuator.

Preferably the or each first bearing surface is a surface on the seal carrier that is placed under bearing stress by the pressure within the cylinder.

Preferably the or each seal carrier first bearing surface is a convex surface.

Preferably the or each convex bearing surface of the seal carrier is a part circular, or arc shaped surface.

Preferably the or each sealing member and seal carrier are part of a seal assembly, and the seal assembly further includes a washer or packing made of a resilient material and situated between an aft surface of the seal carrier and an aft surface of the seal assembly mounting groove of its associated hydraulic actuator.

Preferably the or each washer or packing is made of an elastomeric material, for example urethane.

Preferably the or each seal assembly includes a substantially rigid washer situated between the seal carrier and the elastomeric washer or packing.

Preferably the or each seal carrier supports a wiper device.

Preferably the or each seal assembly is situated adjacent to the opening of its associated cylinder.

Preferably the or each seal assembly is held within its associated seal mounting groove by a mounting collar.

Optionally the or each seal carrier is restrained from rotating about the principle axis of its associated sealing member, for example by keying the or each seal carrier to its associated seal mounting groove using a dowel pin.

In a seventh aspect, the invention may broadly be said to consist in a machine or device incorporating at least one sealing system substantially as specified herein.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Figure 4:
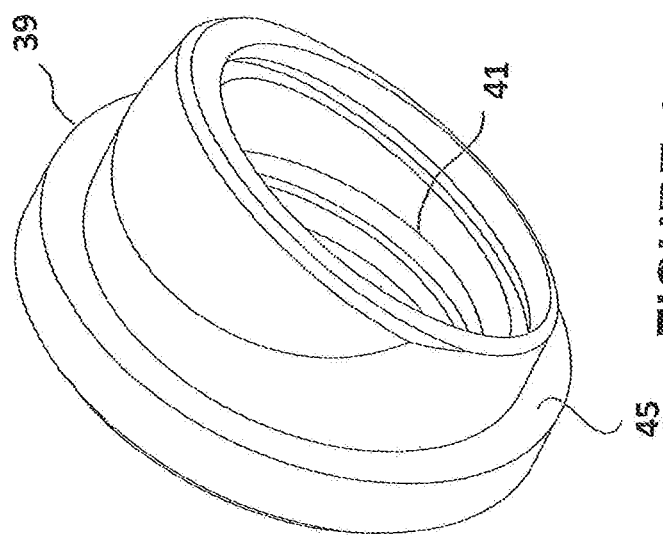
Figure 3:
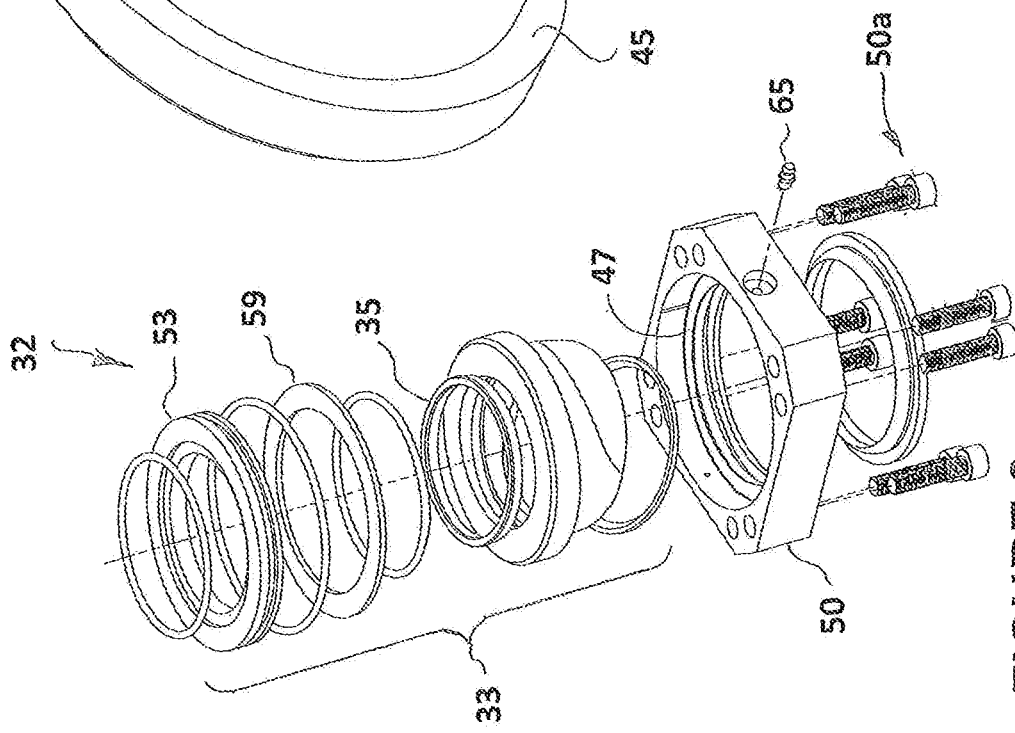
Figure 9:
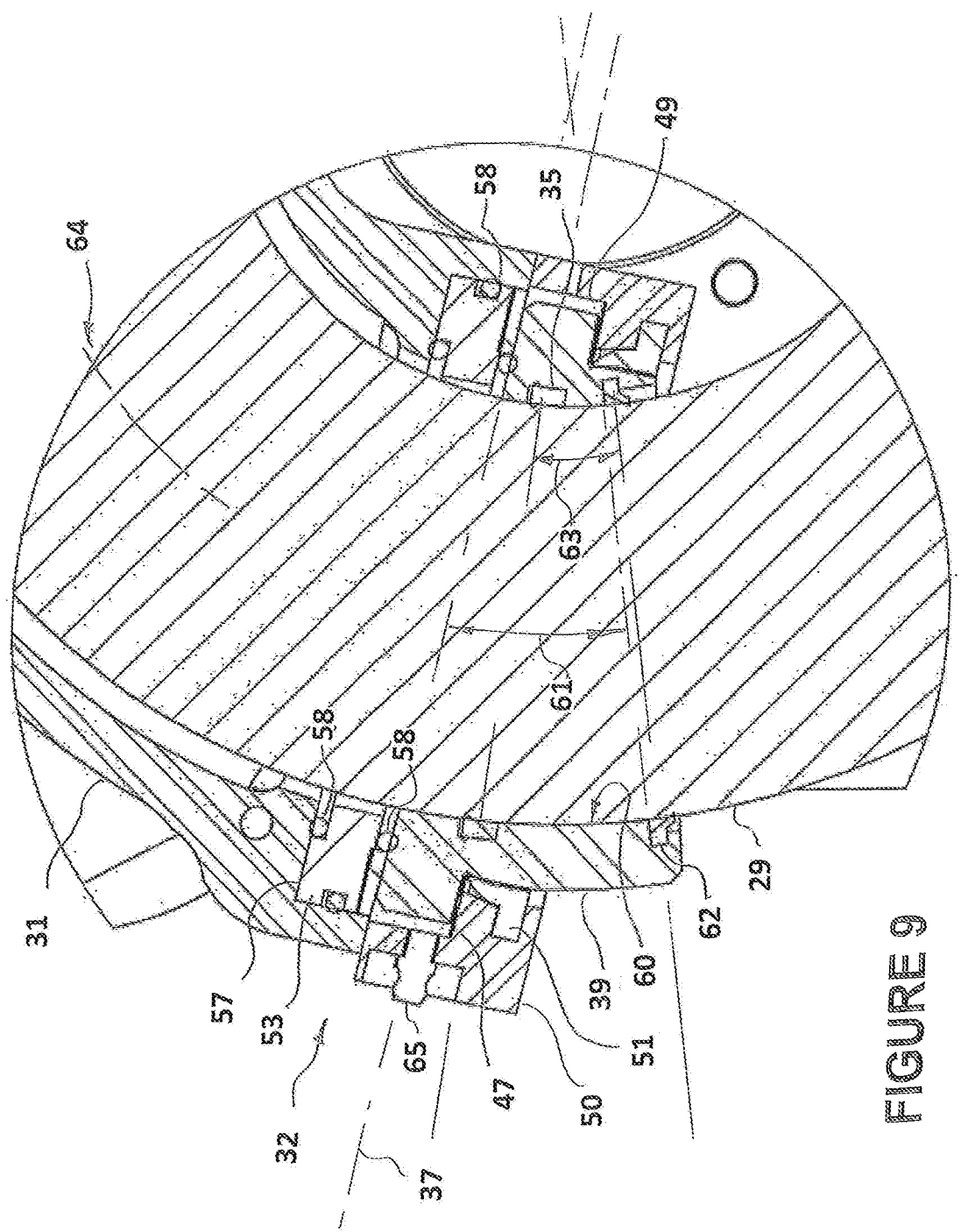
Figure 12:
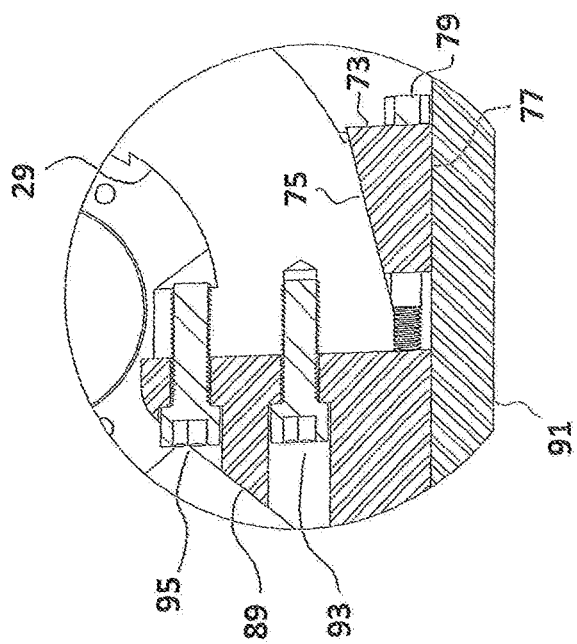
Figure 11:
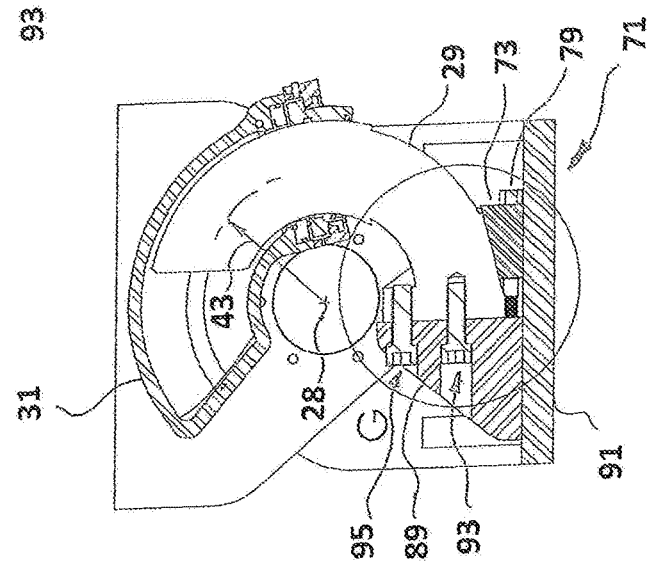
Figure 10:
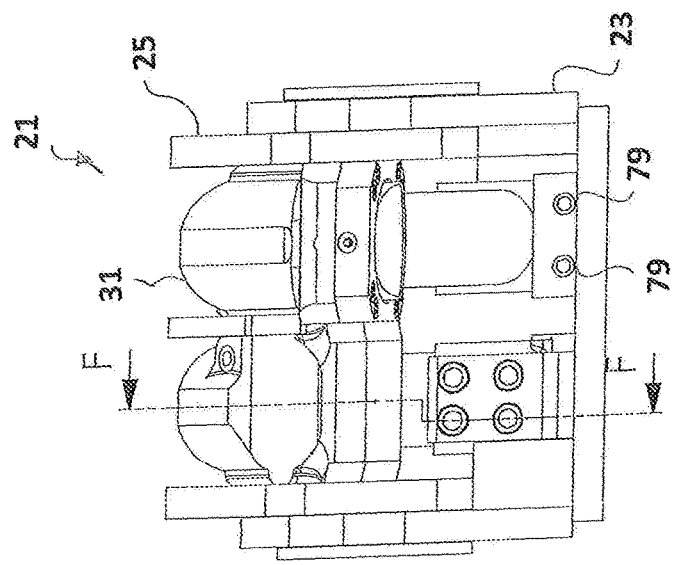

Further aspects of the present invention will become apparent from the following description which is given by way of example only and with reference to the accompanying drawings in which:

FIG. 1 is a perspective view of a fluid powered rotary actuator assembly according to the present invention, FIG. 2 is an exploded perspective view of the fluid powered rotary actuator assembly, FIG. 3 is an exploded perspective view of a seal sub-assembly of the fluid powered rotary actuator assembly, FIG. 4 is a perspective view of a seal carrier of the seal sub-assembly shown in FIG. 4, FIG. 5 is a plan view of the seal carrier defining a cross sectional plane H, FIG. 6 is a cross sectional view of the seal carrier, the cross sectional plane being that defined by plane H in FIG. 5, FIG. 7 is a front elevation view of the fluid powered rotary actuator assembly defining a cross sectional plane B, FIG. 8 is a cross sectional view of the fluid powered rotary actuator assembly, the cross sectional plane being that defined by plane B in FIG. 7, the view defining a detailed area within a circle D, FIG. 9 is a cross sectional view of the detail contained within circle D defined in FIG. 8, the detail showing the seal sub-assembly in an assembled state, FIG. 10 is a front elevation view of the fluid powered rotary actuator assembly defining a cross sectional plane F, FIG. 11 is a cross sectional view of the fluid powered rotary actuator assembly, the cross sectional plane being that defined by plane F in FIG. 10, the view defining a detailed area within a circle G, and FIG. 12 is a cross sectional view of the detail contained within circle G defined in FIG. 11, the detail showing the method of attachment of a toroidal piston of the fluid powered rotary actuator assembly to a an actuator frame member.

With reference to FIGS. 1 to 12, a fluid powered rotary actuator (21) according to the present invention will now be described. The fluid powered rotary actuator (21) shown and described is a hydraulic rotary actuator, and will be referred to as such in the following description. The hydraulic rotary actuator (21) has been designed initially for use in a tilt hitch for use in mounting attachments to the dipper arm of excavators or similar equipment used in earthmoving, demolition, construction, forestry or related industries. It is envisaged that the hydraulic rotary actuator (21) will have a multitude of uses in other fields, especially where a constant turning force, compact design, simplicity of construction and durability are beneficial features.

The hydraulic rotary actuator (21) includes a first member (23) and a second member (25) which is pivotally connected to the first member (23). The hydraulic rotary actuator (21) is configured such that the second member (25) is moved relative to the first member (23). For example the first member (23) could be a fitting configured to be mounted via connecting pins to the free end of the dipper arm of an excavator, and the second member (25) could be a part of a hitch used to connect work attachments such as a bucket or grab to the dipper arm. In such an application, the hydraulic rotary actuator (21) can be used to vary the angle of the bucket, for example to assist the excavator operator in forming a sloping surface.

Such applications require very robust and compact actuators, with a high operating torque, and preferably a fairly constant torque throughout the range of movement. It is exactly this type of application that has driven the development of the present invention.

In this example, the first member (23) and the second member (25) are operatively connected by two opposing hydraulic actuators (27). This gives controlled and powered movement about the pivotal connection between the first member (23) and the second member (25), in two opposing directions. The pivotal connection between the first member (23) and the second member (25) defines a principal axis (28) of the actuator (21).

Each of the hydraulic actuators (27) has a substantially toroidal or part toroidal shaped spear or piston (29) and a cylinder (31) configured to receive the toroidal shaped spear. In this example, each cylinder (31) is a substantially toroidal or part toroidal shaped cylinder. The cylinders (31) are formed as two halves split along the principal plane of the part toroid shape of each cylinder. Each half is machined and then the two are welded together to form a toroidal cylinder.

In this example, the spears (29) are mounted to the first member (23) and the cylinders (32) are mounted to the second member (25).

Each hydraulic actuator (27) also includes a sealing system (32) configured to minimise or prevent leakage of fluid from each cylinder (31). Each sealing systems (32) further includes a seal assembly (33) which further includes a sealing member (35). Each sealing system (32) is configured to allow a range of movement of the sealing member (35) in a plane (37) substantially perpendicular to the direction of travel, relative to the cylinder (31), of the part of the spear (29) that is adjacent to the sealing member (35).

While the hydraulic seals of conventional actuators are allowed to move a small amount in a direction that is parallel to the direction of travel of the spear, a feature of the sealing system (32) of the present invention is that the movement of the hydraulic seals is in a greater range of directions and/or allows variations in the orientation of the sealing member (35). That is, movement of the sealing member (35) in the present invention is not restricted only to movement in the direction of travel of the part of the spear (29) that is adjacent to the sealing member (35).

Each seal assembly (33) is situated adjacent to the opening of its associated cylinder (31). Each seal assembly (33) includes a seal carrier (39) that is configured to support the sealing member (35). The sealing member (35) in this example is a conventional hydraulic seal and is supported within an appropriately sized seal groove (41) positioned within the inside diameter of the seal carrier (39).

Each seal assembly (33) is configured such that the seal carrier (39) can move in the plane (37). This allows the sealing member (33) to move relative to the cylinder (31) as the spear (29) flexes under load. This movement in the plane (37) helps to reduce the possibility of binding between the spear (29) and any components of the cylinder (31), and also accommodates some of the sealing challenges associated with misalignment between the axes of the toroidal shaped spears (29) and their associated toroidal shaped cylinders (31) throughout the full range of movement of each spear (29) within its associated cylinder (31).

Also, each seal assembly (33), and in particular each seal carrier (39), is also configured such that the seal carrier (39) is able to rotate or rock about an axis that is substantially parallel to the principal axis (28) of the actuator (21). This is a very important aspect of the present invention. This additional degree of freedom of the seal carrier (39) accommodates the minute changes in the alignment between the axis of each toroidal spear (29) and its associated toroidal cylinder (31) due to the above mentioned misalignment issues between the axes of the toroidal shaped spear (29) and their associated toroidal shaped cylinder (31), and due to flexing of the spear (29) when under load. The spears (29) tend to straighten slightly as the pressure of the hydraulic fluid in the cylinders (31) increases.

The flexing of the spears (29) when under load has been one of the most significant challenges in producing a reliable rotary actuator (21) of the type described herein. In addition to the developments relating to the sealing system, attention has been given to the diameter of the spears and the orbit radius (43) of the spears (29). Each spear (29) travels in an orbit about the principal axis (28) of the actuator (21). The orbit radius (43) of the spears (29) is the major radius of the torus shape of which each toroidal shaped spear (29) is a part of.

The diameter of the spears (29) and the major radius (43) of the spears (29) directly affect the output torque of the rotary actuator (21) as well as the maximum range of movement or operating angle of the rotary actuator (21). Testing has shown that a ratio of spear diameter to major radius (43) of between 0.6 and 0.75 is desirable. In the example described, the spear diameter is fifty seven millimetres and the major radius is eighty one millimetres, giving a ratio of spear diameter to major radius of 0.7.

In this example, the rotation or rocking of the seal carrier (39) about an axis substantially parallel to the principal axis (28) of the actuator (21) is facilitated by a curved or convex surface on the seal carrier (39). Each seal carrier (39) includes a first bearing surface (45) that is configured to bear against a corresponding second bearing surface (47) of a seal assembly mounting groove (49) of its associated hydraulic actuator (27). The seal assembly mounting groove (49) is another part of each sealing system (32). Each first bearing surface (45) is a surface on its associated seal carrier (39) that is placed under bearing stress by the pressure within its associated cylinder (31).

Each seal assembly (33) is held within its associated seal assembly mounting groove (49) by a mounting collar (50) which forms a part of each seal assembly mounting groove (49). Each mounting collar (50) is bolted to the open end of its associated cylinder (31) using eight capscrews (50a). A first wiper seal (51) is mounted in a neck region of the collar (50) and is configured to keep contaminants such as dirt and sand out of the seal assembly mounting groove (49), and to keep lubricant within the groove (49).

In this example the first bearing surface (45) has a curved or a convex surface having a part circular, or arc shaped surface. The first bearing surface (45) is itself a circular shoulder of the seal carrier (39), and in a prototype version of the invention the seal carrier (39), and therefore the shoulder also, has a diameter of approximately eighty five millimetres. When the shoulder is viewed in cross section, as shown in FIG. 6, the very shallow convex curve can be seen.

The shallow curve has a curve radius (52) of between one and two metres. The highest points on the curve on the shoulder are situated one millimetre above or away from a plane passing through the lowest points on the curve on the shoulder. The curve radius (52) is preferably in the range of fifteen to twenty five times the major radius (43) of the spear (29), and in this example is about twenty times the major radius (43).

Each seal assembly (33) also includes a resilient washer or packing (53) made of a resilient material, or an elastomeric material, for example urethane or nitrile rubber. The resilient washer (53) is situated between an aft or rear face (55) of the seal carrier (39) and an aft or rear face (57) of the seal assembly mounting groove (49) of its associated hydraulic actuator (27). The resilient washer (53) is relatively thick, for example approximately nine millimetres thick in the present example. Appropriately positioned O-rings (58) are used to prevent leakage of hydraulic fluid past the resilient washer (53).

During assembly, when each mounting collar (50) is bolted to the end of its respective cylinder (31), the resilient washer or packing (53) is compressed slightly. The resilient washer or packing (53) holds the seal carrier (39) butted against the second bearing surface (47), while allowing the seal carrier (39) to rock slightly as noted above. When the seal carrier (39) rocks slightly, one section of the resilient washer or packing (53) is compressed while the opposite section is allowed to expand slightly.

Each seal assembly (33) also includes a substantially rigid flat washer (59) situated between the seal carrier (39) and the elastomeric washer or packing (53). The flat washer (59) is preferably made of a hard plastic, a metal or a metal alloy, for example a steel or brass material. The flat washer (59) carries the relatively light bearing load between the seal carrier (39) and the elastomeric washer (53) and is intended to allow the seal carrier (39) to slide or move laterally with respect to the elastomeric washer (53) without causing significant wear to the elastomeric washer (53).

It can be seen in FIG. 9 that the inside diameter of each seal carrier (39) forms a part toroidal shaped bearing surface (60) configured to engage with, and slide along, its associated spear (29). The bearing surface (60) has an arc of contact (61) with the spear (29) of approximately twenty degrees.

It can also be seen that each seal carrier (39) supports a second wiper device (62), for example a standard hydraulic actuator wiper. In the example shown the wiper device (62) is spaced apart from its associated sealing member (35) on the seal carrier (39). In this example, the principal plane of the wiper device (62) lies at an angle (63) of about fifteen degrees to the principal plane of its associated sealing member (35).

The arc of contact (61) between the bearing surface (60) and the spear (29) prevents rotation of each seal carrier (39) about a centreline (64) of its associated curved spear (29), or about a principal axis of its associated sealing member (35). It is envisaged that an arc of contact (61) greater than fifteen degrees is sufficient to prevent or at least minimise rotation of each seal carrier (39) about the centreline (64). It is also envisaged that the offset between the planes of the wiper device (62) and the sealing member (35), would help to prevent or at least minimise rotation of each seal carrier (39) about the centreline (64).

A grease nipple (65) is situated on each mounting collar (50) and communicates with each seal assembly mounting groove (49). The grease nipples (65) are provided as a means by which lubricant can be supplied to at least the first bearing surfaces (45) of each seal carrier (39). As noted above, the first bearing surface (45) which is a surface on the seal carrier (39), bears against the second bearing surface (47) which is a surface on the mounting collar (50) and which forms a part of the seal assembly mounting groove (49).

The grease, or at least some type of lubricating system is helpful since each seal carrier (39) is pressed against its respective second bearing surface (47) with considerable force due to the hydraulic pressure within the cylinders (31). And while under such loading, each seal carrier (39) is required to both rock and to move laterally relative to its associated seal mounting groove (49) as required to allow for deflections and misalignments of each spear (29) relative to its cylinder (31).

With reference to FIGS. 10 to 12 it can be seen that the hydraulic rotary actuator (21) has a rigid connection between each of the toroidal shaped spears (29) and its associated first member (23). And it can be seen that the rigid connection has a fastening system which includes threaded fasteners, and a pre-stressing system. In this example, the pre-stressing system is a pre-stressing mechanism which includes a wedged compression joint (71).

The wedged compression joint (71) is formed with the inclusion of a wedge shaped member (73). Each wedge shaped member (73) is a separate member that is wedged between a first wedge bearing surface (75) on its associated spear and a second wedge bearing surface (77) on its associated first or second member.

Each wedge shaped member (73) is wedged into position between its associated first wedge bearing surface (75) and second wedge bearing surface (77) using two threaded fasteners (79).

The first wedge bearing surface (75) which is a surface on each spear (29), is a flat surface formed on a foot portion (81) of each spear (29). With reference to FIG. 2 it can be seen that the foot portion (81) of each spear (29) includes a first base plate (83) and two triangular shaped gussets (85) which each extend from the base plate (83) and partly up the sides of the fixed end (87) of each spear (29). The base plate (83) and the gussets (85) are welded to the fixed end (87). The first wedge bearing surface (75) is then machined to form a flat surface which lies at an angle of approximately seventy five degrees to a mating surface (88) of the first base plate (83). It is envisaged that the first wedge bearing surface (75) could lie at any angle between a range of seventy and eighty five degrees to the mating surface (88).

It is worth noting that the area where the inside diameter of the curve or the spear (29) butts the first base plate (83) is preferably not welded. Experience has shown that this area of each spear (29) is placed under the most stress when the rotary actuator (21) is in use, and for this reason welding which can lead to weakening of the material of the spear (29) is avoided in this area. The addition of the wedged compression joint (71) is designed to reduce stresses in this potentially highly stressed area, as will be explained below.

The foot portion (81) of each spear (29) is bolted directly to a mounting bracket (89) of the first member (23). The mounting bracket (89) is a right angled bracket which is in turn bolted to a second base plate (91) of the first member (23). The mounting bracket (89) is attached to an area on the second base plate (91) which is adjacent to the second wedge bearing surface (77).

In this example, the bolted connection between the spear (29) and the bracket (89) includes a fastening system in the form of two fastened areas. The two fastened areas are in the form of two rows of threaded fasteners or bolts. A first fastened area or first row of bolts (93) is situated in the foot portion (81) of each spear (29) adjacent to the first wedge bearing surface (75) of that spear (29). And a second fastened area or second row of bolts (95), is situated between the first fastened area (93) and the edge of the base plate (83) that is distal to the first wedge bearing surface (75) of each spear (29). The first fastened area (93), could be said to be situated between the second fastened area (95) and the wedged compression joint (71) of the pre-stressing system.

As a result of this configuration of the first and second rows of bolts (93) and (95), when the pre-stressing system is activated, that is, when the wedge (73) is driven into the wedge shaped gap between the first wedge bearing surface (75) and the second wedge bearing surface (77) using two threaded fasteners (79), the wedge (73) exerts a strong compressive force against the first wedge bearing surface (75). At least a component of the force exerted by the wedge (73) acts radially, or in line with the major radius (43) of the spear (29) adjacent to the wedge (73).

The first row of bolts (93) act like a pivotal connection, and the strong compressive forces from the wedge (73) being transferred about the 'pivotal connection' and resulting in a compressive force being felt between the foot portion (81) of each spear and the bracket (89) in the region of the second row of fasteners (95).

This pre-stressing of the joint in the area adjacent the second row of fasteners (95) and the associated compressive loads within the foot portion (81) of each spear is highly advantageous. This is due to the fact that when the rotary actuator (21) is in use, the spears (29) are caused to straighten slightly by the hydraulic forces. This produces tensile forces which are felt in the foot portion (81) in the area of the second row of fasteners (95). These tensile forces are at least partially cancelled by the pre-stressed compressive forces introduced into the area of the second row of fasteners (95) by the wedged compression joint (71).

Similarly, the forces causing the spears (29) to straighten produce significant compressive forces in the foot potion (81) in the area of the first row of fasteners (93). And since these fasteners are placed in tension by the wedged compression joint (71), the forces produced by the spears are at least partially cancelled by the pre-stressed tensile forces introduced into the first row of fasteners (93) by the wedged compression joint (71).

Another feature of the design of the hydraulic rotary actuator (21) according to the present invention is that each cylinder (31) is sized and shaped such that clearance is provided between the internal walls of the cylinder (31) and its associated toroidal shaped spear (29). And this clearance exists during the full range of movement of the spear (29) when the rotary actuator (21) is operated in a loaded or unloaded manner There are no bearing surfaces, or bearing members, situated between each cylinder (31) and its associated spear (29) and which constrain the movement of the spear (29).

The only support for each spear (29) is the connection between the foot portion (81) of the spear and the first member (23). Apart from this connection, each spear is able to flex unrestrained by any direct contact with its associated cylinder (31). The only contact with the cylinder (31) is indirect contact via the sealing member (35) and wiper ring (62), the seal carrier (39) and the seal assembly mounting groove (49). And given that the sealing system (32) allows relative movement between the seal carrier (39) and the sealing groove (49), this indirect contact does not restrain the spear (29) in any direction or restrain the spear (29) from flexing or straightening.

This design feature is particularly useful in that wear between each spear (29) and its cylinder (31) is eliminated, or almost eliminated. Also, the manufacture of the cylinders (31) becomes significantly easier. Since there is clearance at all times, the tolerances of the dimensions of the internal walls of the cylinders (31) become much more relaxed. This relaxation in the dimensioning accuracy requirements means that the cylinders (31) can be manufactured with greater ease.

In practice, the inventor has had prototype cylinders machined or cast in two halves and welded together. Purging the interior of the cylinders (31) with inert gas during welding helps to minimise imperfections along the weld lines. The relaxation of the dimension tolerances allows the cylinders (31) to be manufactured without any machining deep within the cylinder bores. The only machining requirements are located at the opening of the cylinders, that is, machining to facilitate the sealing system (32).

VARIATIONS

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

In the example described above, the fluid powered rotary actuator (21) was noted as being an hydraulic rotary actuator. However, it is envisaged that in another embodiment, the fluid powered rotary actuator could be a pneumatic rotary actuator.

In the example described above, the cylinders (31) and pistons or spears (29) are described as being substantially toroidal shaped, or part toroidal shaped. A toroidal shape usually has a circular cross section, however, it is envisaged that the cylinders (31) and pistons or spears (29) could have alternative cross-sectional shapes, for example oval or elliptical cross sectional shapes and having an arcuate principal axis so as to remain substantially toroidal or part toroidal shaped. In such a variation, the sealing members (35) and seal carriers (39) etc., will need to match any non-circular cross sectional shape of the cylinders (31) and pistons or spears (29).

In the example described above, the hydraulic rotary actuator (21) has two hydraulic actuators. It is envisaged that a single actuator could be used (perhaps with a spring or gravity return), or any number of actuators, for example two, four or six axially offset cylinders.

The seal carrier (39) is described as having a curved or convex surface which facilitates the rocking action of the seal carrier (39). In an alternative embodiment, the curved or convex surface could be on the second bearing surface (47) which is a surface on the mounting collar (50). As a further alternative the seal carrier (39) could be supported on spigot shafts and bearings which allow the seal carrier (39) to rock.

In the example described above, the seal carrier (39) is prevented from rotating about the centreline of the spear (29), or about the principle axis of its associated sealing member (35), by an offset relationship between the sealing member (35) and the wiper (62). The rotation could similarly be prevented by an offset between the seal (35) and a bearing that is mounted on the seal carrier, that is, the rotation could be prevented by any two components that are in contact with the spear (29), but which lie in planes that are at an angle to the other. As a further option, each seal carrier (39) could be restrained from rotating about the principle axis of its associated sealing member (35) by keying the or each seal carrier to its associated seal mounting groove using a dowel pin.

In the example described above, each seal assembly (33) is situated within a mounting groove (49) located in the cylinder (31) adjacent the opening of the cylinder (31). It is envisaged that each seal assembly (33) could alternatively be mounted within a mounting groove situated on its associated piston or spear (29). In such a case, the dimensions of the internal bore of the cylinders (31) would require higher tolerances to allow the seal assembly (33) to sweep the length of the bores.

The spears (29) shown in the accompanying drawings are not connected to a piston, the spears (29) also perform the function of a piston in a hydraulic ram. An alternative embodiment could include a piston attached to each spears (29).

In the example described above, each spear (29) is attached to the first member (23) and the cylinders (32) are mounted on the second member (25). In an alternative embodiment, the spears (29) could be attached to the second member (25) and the cylinders (32) to the first member (23), or any combination of attachments.

Optionally the wedge shaped member (73) could be a part of the foot or base portion (81) of each spear (29), or a part of the first or second member that the spear (29) is attached to. In such a case, the wedge shaped member could be configured to bear against an appropriately configured bearing surface on the mating part to produce the pre-stressing function noted above.

The example described above includes a first fastened area (93) and a second fastened area (95), both in the form of a row of bolts. It is envisaged that alternative fastening methods could be employed, for example the row of bolts of the first fastened area (93) could be replaced with a hooked joint, for example a lip formed on the first base plate (83) which is configured to mate with a corresponding recess formed on the mounting bracket (89). In such a case the hooked joint would be configured to resist the tensile stresses introduced to the first fastened area (93) by the pre-stressing system.

The pre-stressing mechanism in the example described above includes a wedge shaped member (73) and the installation of the wedge shaped member (73) produces the pre-stressing action. However, in another embodiment, the pre-stressing mechanism could include the use of an alternative mechanism, for example the use of one or more threaded members, or a locking cam. In such cases the configuration would allow rotation of the threaded members or the cam to apply a force having at least a component of which that acts in line with the major radius (43) of the spear (29) in the area adjacent to the pre-stressing mechanism.

The lubricating system in the example described above uses a grease nipple to allow grease to be applied to the bearing surfaces at the contact between the seal carrier (39) and the seal assembly mounting groove (49). Alternatively the lubrication could be provided by a graphite layer, or by the use of a self lubricating material that forms one of the bearing surfaces, or that is situated between the bearing surfaces.

The examples described above are primarily manufactured by welding and machining, however, it is envisaged that parts such as the cylinder housings or the toroidal pistons or spears could be cast or forged.

The example described above shows the seal assembly used in a rotary actuator having a toroidal shaped spear. It is envisaged that the same idea could be used in a linear actuator, for example in a slender linear actuator where some flexing of the spear may occur, and where a self-aligning sealing system could be advantageous.

Definitions

The term "major radius" used in the specification is intended to mean the radius of revolution of the circle that defines the torus shape of which each piston or spear is a part of.

Throughout this specification the word "comprise" and variations of that word, such as "comprises" and "comprising", are not intended to exclude other additives, components, integers or steps.

Advantages

Thus it can be seen that at least the preferred form of the invention provides a hydraulic rotary actuator which;
is robust and compact,
is simple and easily serviced,
has minimal chance of contact and binding between each spear and cylinder,
incorporates a sealing system designed for improved flexibility and durability,
includes a spear mounting design configured to significantly reduce spear mounting structural failures, and
includes a cylinder/spear configuration that facilitates easier and lower cost toroidal cylinder manufacture.

The invention claimed is:

1. A fluid powered rotary actuator, comprising:
a first member;
a second member; and
at least one hydraulic actuator,
the first member being pivotally connected to the second member,
the first and second members also being operatively connected by the at least one hydraulic actuator,
the at least one hydraulic actuator having a substantially toroidal shaped or part toroidal shaped spear or piston, a substantially toroidal shaped or part toroidal shaped cylinder configured to receive the toroidal shaped spear or piston, a seal assembly mounting groove located between the cylinder and a mounting collar, and a seal assembly configured to minimize or prevent leakage of fluid from the cylinder,
wherein the seal assembly includes a sealing member and a seal carrier configured to support the sealing member of the seal assembly,
wherein the seal carrier has a first bearing surface and the seal assembly mounting groove has a second bearing surface,
wherein at least one of the first and second bearing surfaces is a convex bearing surface,
wherein the seal assembly is situated within the seal assembly mounting groove and is configured to allow a range of movement of the sealing member of the seal assembly, the movement not being restricted to a direction that is substantially parallel to the direction of travel of the part of the spear or piston that is adjacent to the sealing member, and
wherein contact between the seal carrier and the seal assembly mounting groove includes contact between the first and second bearing surfaces.

2. The fluid powered rotary actuator as claimed in claim 1, wherein the range of movement of the sealing member includes movement that is substantially in a plane perpendicular to the direction of travel of the part of the spear or piston that is adjacent to the sealing member.

3. The fluid powered rotary actuator as claimed in claim 2, wherein the seal assembly is configured such that the seal carrier can move in the plane substantially perpendicular to the direction of travel of the part of the spear or piston that is adjacent to the sealing member.

4. The fluid powered rotary actuator as claimed in claim 3, wherein the seal carrier is configured such that the seal carrier is able to rotate or rock about an axis that is substantially parallel to an axis of the pivotal connection between the first member and the second member.

5. The fluid powered rotary actuator as claimed in claim 4, wherein the seal assembly includes a washer or packing made of a resilient material and situated between a surface of the seal carrier and a rear surface of the seal assembly mounting groove of the at least one hydraulic actuator.

6. The fluid powered rotary actuator as claimed in claim 1, wherein the seal carrier is configured such that the seal carrier is able to rotate or rock about an axis that is substantially parallel to an axis of the pivotal connection between the first member and the second member.

7. The fluid powered rotary actuator as claimed in claim 1, wherein the first bearing surface is a surface on the seal carrier that is placed under bearing stress by the pressure within the cylinder.

8. The fluid powered rotary actuator as claimed in claim 1, wherein the seal carrier first bearing surface is a convex surface.

9. The fluid powered rotary actuator as claimed in claim 8, wherein the convex bearing surface of the seal carrier is a part circular, or arc shaped surface.

10. The fluid powered rotary actuator as claimed in claim 1, wherein the seal assembly includes a washer or packing made of a resilient material and situated between a surface of the seal carrier and a rear surface of the seal assembly mounting groove of the at least one hydraulic actuator.

11. The fluid powered rotary actuator as claimed in claim 10, wherein the washer or packing is made of an elastomeric material.

12. The fluid powered rotary actuator as claimed in claim 11, wherein the seal assembly includes a substantially rigid washer situated between the seal carrier and the washer or packing made of a resilient material.

13. The fluid powered rotary actuator as claimed in claim 1, wherein an inside diameter of the seal carrier has a part toroidal shaped bearing surface configured to engage with and slide over the spear.

14. The fluid powered rotary actuator as claimed in claim 13, wherein the toroidal shaped bearing surface has an arc of contact with the spear of at least fifteen degrees.

15. The fluid powered rotary actuator as claimed in claim 13, wherein the seal carrier supports a wiper device.

16. The fluid powered rotary actuator as claimed in claim 15, wherein the wiper device is spaced apart from the sealing member, and lies in a plane that is at an angle of at least ten degrees from the plane of the sealing member.

17. The fluid powered rotary actuator as claimed in claim 1, wherein the seal assembly is situated adjacent to an opening of the cylinder.

18. The fluid powered rotary actuator as claimed in claim 1, wherein the seal assembly is held within the seal assembly mounting groove by the mounting collar.

19. The fluid powered rotary actuator as claimed in claim 1, wherein the at least one hydraulic actuator is provided with a lubrication system configured to supply a lubricant to at least the first bearing surface of the seal carrier.

20. A machine or device comprising:
at least one fluid powered rotary actuator comprised of:
a first member;
a second member; and
at least one hydraulic actuator,
the first member being pivotally connected to the second member,
the first and second members also being operatively connected by the at least one hydraulic actuator,
the at least one hydraulic actuator having a substantially toroidal shaped or part toroidal shaped spear or piston, a substantially toroidal shaped or part toroidal shaped cylinder configured to receive the toroidal shaped spear or piston, a seal assembly mounting groove located between the cylinder and a mounting collar, and a seal assembly configured to minimize or prevent leakage of fluid from the cylinder,
wherein the seal assembly includes a sealing member and a seal carrier configured to support the sealing member of the seal assembly,
wherein the seal carrier has a first bearing surface and the seal assembly mounting groove has a second bearing surface,
wherein at least one of the first and second bearing surfaces is a convex bearing surface,
wherein the seal assembly is situated within the seal assembly mounting groove and is configured to allow a range of movement of the sealing member of the seal assembly, the movement not being restricted to a direction that is substantially parallel to the direction of travel of the part of the spear or piston that is adjacent to the sealing member, and
wherein contact between the seal carrier and the seal assembly mounting groove includes contact between the first and second bearing surfaces.

21. A tilt hitch for use with excavation equipment, the tilt hitch comprising:
at least one fluid powered rotary actuator comprised of:
a first member;
a second member; and
at least one hydraulic actuator,
the first member being pivotally connected to the second member,
the first and second members also being operatively connected by the at least one hydraulic actuator,
the at least one hydraulic actuator having a substantially toroidal shaped or part toroidal shaped spear or piston, a substantially toroidal shaped or part toroidal shaped cylinder configured to receive the toroidal shaped spear or piston, a seal assembly mounting groove located between the cylinder and a mounting collar, and a seal assembly configured to minimize or prevent leakage of fluid from the cylinder,
wherein the seal assembly includes a sealing member and a seal carrier configured to support the sealing member of the seal assembly,
wherein the seal carrier has a first bearing surface and the seal assembly mounting groove has a second bearing surface,
wherein at least one of the first and second bearing surfaces is a convex bearing surface,
wherein the seal assembly is situated within the seal assembly mounting groove and is configured to allow a range of movement of the sealing member of the seal assembly, the movement not being restricted to a direction that is substantially parallel to the direction of travel of the part of the spear or piston that is adjacent to the sealing member, and
wherein contact between the seal carrier and the seal assembly mounting groove includes contact between the first and second bearing surfaces.

* * * * *